(12) United States Patent
Schundelmeier et al.

(10) Patent No.: US 11,093,475 B2
(45) Date of Patent: Aug. 17, 2021

(54) EXTERNAL CHANGE DETECTION

(71) Applicant: salesforce.com, inc., San Francisco, CA (US)

(72) Inventors: Ralf Schundelmeier, Berkeley, CA (US); Thomas Pollinger, San Mateo, CA (US)

(73) Assignee: salesforce.com, inc., San Francisco, CA (US)

(*) Notice: Subject to any disclaimer, the term of this patent is extended or adjusted under 35 U.S.C. 154(b) by 265 days.

(21) Appl. No.: 15/803,408

(22) Filed: Nov. 3, 2017

(65) Prior Publication Data

US 2019/0138608 A1   May 9, 2019

(51) Int. Cl.
| | |
|---|---|
| *G06F 16/23* | (2019.01) |
| *G06F 16/27* | (2019.01) |
| *G06Q 30/00* | (2012.01) |
| *G06F 16/14* | (2019.01) |
| *G06F 16/18* | (2019.01) |
| *G06F 21/30* | (2013.01) |
| *G06Q 30/06* | (2012.01) |

(52) U.S. Cl.
CPC ............ *G06F 16/23* (2019.01); *G06F 16/14* (2019.01); *G06F 16/1865* (2019.01); *G06F 16/273* (2019.01); *G06F 21/30* (2013.01); *G06Q 30/01* (2013.01); *G06Q 30/06* (2013.01)

(58) Field of Classification Search
CPC .................................. G06F 16/14; G06F 16/23
See application file for complete search history.

(56) References Cited

U.S. PATENT DOCUMENTS

| | | | | | |
|---|---|---|---|---|---|
| 8,607,306 | B1* | 12/2013 | Bridge | ................... | H04L 63/08 |
| | | | | | 726/1 |
| 8,789,208 | B1* | 7/2014 | Sundaram | ............... | H04L 29/06 |
| | | | | | 726/29 |
| 9,225,707 | B1* | 12/2015 | de Sousa | .............. | G06F 21/629 |
| 2009/0172525 | A1* | 7/2009 | Mayor | ................... | G06Q 10/10 |
| | | | | | 715/273 |

(Continued)

OTHER PUBLICATIONS

Extended European Search Report directed to related European Patent Application No. 18204312.5, dated Dec. 21, 2018; 12 pages.

(Continued)

*Primary Examiner* — Mohammad S Rostami
(74) *Attorney, Agent, or Firm* — Sterne, Kessler, Goldstein & Fox P.L.L.C.

(57) ABSTRACT

Disclosed herein are system, method, and computer program product embodiments for performing external change detection without copying data from an external system. An embodiment operates by transmitting a registration request comprising data selection criteria to a data service at an external system. The external system generates a tracking token representing a transaction state of a data object satisfying the data selection criteria. The embodiment receives the tracking token. The embodiment detects a change to the data object in the external system using the tracking token. The embodiment receives the change to the data object from the external system based on the detecting. The embodiment then processes the change to the data object.

20 Claims, 3 Drawing Sheets

(56) References Cited

U.S. PATENT DOCUMENTS

| | | | | |
|---|---|---|---|---|
| 2012/0005283 | A1* | 1/2012 | Provo | G06Q 10/10 |
| | | | | 709/206 |
| 2012/0054841 | A1* | 3/2012 | Schultz | G06F 21/51 |
| | | | | 726/6 |
| 2012/0110174 | A1* | 5/2012 | Wootton | G06F 21/564 |
| | | | | 709/224 |
| 2013/0104202 | A1* | 4/2013 | Yin | G06F 21/42 |
| | | | | 726/5 |
| 2013/0167228 | A1* | 6/2013 | Wong | G06F 21/62 |
| | | | | 726/19 |
| 2013/0291094 | A1* | 10/2013 | Sahoo | G06F 21/45 |
| | | | | 726/19 |
| 2014/0195476 | A1 | 7/2014 | Sxhmidt | |
| 2014/0281535 | A1* | 9/2014 | Kane | H04L 63/0428 |
| | | | | 713/168 |
| 2014/0316991 | A1* | 10/2014 | Moshal | G06Q 30/0633 |
| | | | | 705/64 |
| 2015/0269614 | A1* | 9/2015 | Kramer | G06Q 30/0251 |
| | | | | 705/14.49 |
| 2015/0312242 | A1* | 10/2015 | Ogawa | G06F 21/34 |
| | | | | 726/6 |
| 2016/0034872 | A1* | 2/2016 | Hendrick | G06Q 30/0207 |
| | | | | 705/16 |
| 2016/0099963 | A1* | 4/2016 | Mahaffey | H04L 63/0227 |
| | | | | 726/25 |
| 2016/0134599 | A1* | 5/2016 | Ross | G06F 21/41 |
| | | | | 713/168 |
| 2016/0363921 | A1* | 12/2016 | Martindale | G05B 19/128 |
| 2017/0017677 | A1* | 1/2017 | Jolfaei | G06F 16/2358 |
| 2017/0221288 | A1* | 8/2017 | Johnson | G07C 9/257 |
| 2017/0257359 | A1* | 9/2017 | Ogawa | H04L 63/0853 |
| 2017/0300633 | A1* | 10/2017 | Simon | G16H 10/60 |
| 2017/0346851 | A1* | 11/2017 | Drake | H04W 12/02 |
| 2018/0248964 | A1* | 8/2018 | Wei | H04L 67/28 |
| 2018/0332042 | A1* | 11/2018 | Yu | H04W 4/21 |

OTHER PUBLICATIONS

"OData Version 4.0 Part 1: Protocol," OASIS Open 2013, Aug. 14, 2013; 69 pages.

Patterson et al., "Integrate Data, Lightning Fast! Lightning Connect," Apr. 9, 2015, retrieved from https://www.slideshare.net/developerforce/access-external-data-in-realtime-with-lightning-connect (retrieved Dec. 11, 2018); 33 pages.

Patterson et al., "Lightning connect. Integrate Data, Lightning Fast!", Apr. 10, 2015, retrieved from https://www.youtube.com/watch?time_continue=2627&v=i2CA-gT5Mm8 (retrieved Dec. 12, 2018); 1 page.

Daly et al., "Use change tracking to synchronize data with external systems." Oct. 31, 2017, retrieved from https://docs.microsoft.com/en-us/dynamics365/customer-engagement/developer/use-change-tracking-synchronize-data-external-systems (retrieved Dec. 11, 2018); 6 pages.

\* cited by examiner

EXTERNAL CHANGE DETECTION

BACKGROUND

A software system (e.g., a customer relationship management (CRM) system) may need to detect changes and events in an external system that invoke processes and actions in the software system. The software system further needs a way write back the results of these processes directly in to the external system or access for further processing as part of the external changes. For example, a new shipment may arrive at a warehouse and be recorded in an external Enterprise Resource Planning (ERP) system. This new shipment may fulfill an order of a customer. A CRM system may poll the ERP system for this data change in order to trigger a communication to the customer. The CRM system may receive all relevant data from the ERP system to perform the communication.

Currently, a software system may use various middleware technologies to detect changes and events in an external system and write back the results in to the external system. But these existing approaches often require copying the data stored in the external system in to the software system in order to track the changes. In addition, these existing approaches often require transforming the data of the external system into a different data format for the software system. This is expensive in terms of storage, network bandwidth, and computational resources. In addition, this may decrease data security and privacy because the data is stored and managed in two separate systems by potentially two different entities.

Thus, what is needed is a way for a software system to perform external change detection without copying the data from an external system.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for performing external data change detection without copying an entire data set from an external system.

Figure 1:
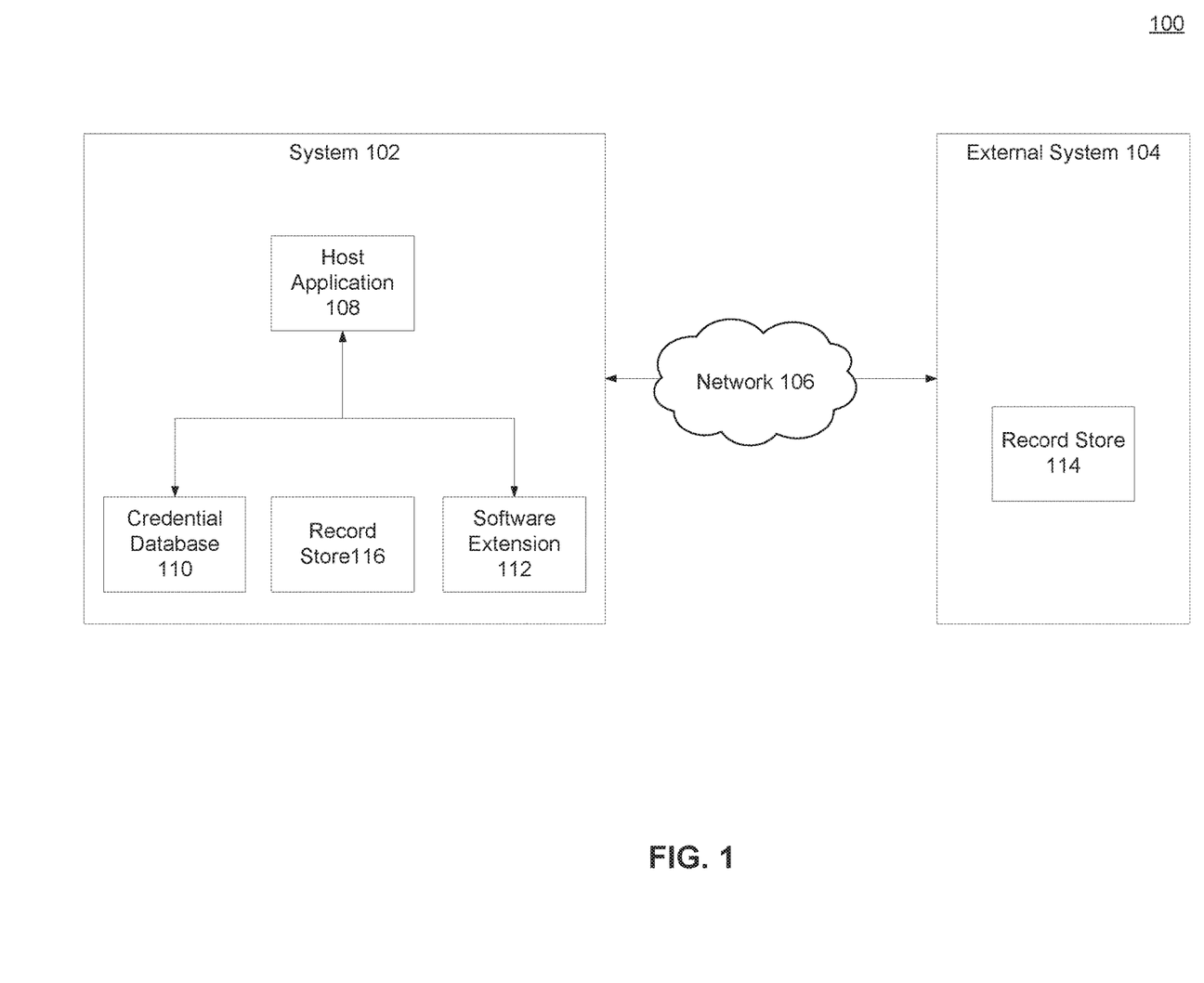
FIG. 1 is a block diagram of a system for performing external change detection, according to some embodiments.

FIG. 1 is a block diagram of a system 100 for performing external change detection, according to some embodiments. System 100 includes system 102 connected to external system 104 via network 106. As would be appreciated by a person of ordinary skill in the art, system 102 may be connected to multiple external systems 104. In some embodiments, system 102 may be a server computer, desktop computer, laptop, tablet, mobile device, wearable electronic device, or other electronic device. In some other embodiments, system 102 may be a software platform for cloud computing. For example, system 102 may be Software as a Service (SaaS) cloud platform where a user subscribes to an application that they access via the Internet.

In some embodiments, external system 104 may be a server computer, desktop computer, laptop, tablet, mobile device, wearable electronic device, or other electronic device. In some other embodiments, external system 104 may be a software platform for cloud computing.

In some embodiments, network 106 may be any network or combination of networks including the Internet, a local area network (LAN), a wide area network (WAN), a wireless network, a cellular network, or various other types of networks as would be appreciated by a person of ordinary skill in the art.

In some embodiments, system 102 includes a host application 108. Host application 108 may be any type of application interested in detecting changes and events in external system 104. For example, host application 108 may be a customer relationship management (CRM) application currently running on system 102.

In some embodiments, host application 108 may be a web app designed to run inside a web browser. In some other embodiments, host application 108 may be a software application designed to run on a server computer, desktop computer, or other type of electronic device. As would be appreciated by a person of ordinary skill in the art, host application 108 may be another type of software application.

In some embodiments, external system 104 may store one or more data objects in record store 114. Record store 114 may be a database or other type of data store. A data object may be an item or collection of data. For example, a data object may be a purchase requisition data object for an Enterprise Resource Planning (ERP) application. As would be appreciated by a person of ordinary skill in the art, a data object may be various other types of data.

In some embodiments, host application 108 may need to process data stored in external system 104. For example, in some embodiments, host application 108 may want to detect and process a change to a data object stored in external system 104. For example, host application 108 may want to detect an event indicating that a new data object been created on external system 104. As would be appreciated by a person of ordinary skill in the art, host application 108 may want to detect various other types of events. Host application 108 may further want to write back a result of processing the change to external system 104.

In some embodiments, host application 108 may access data stored in record store 116 as part of an external data change at external system 104. For example, in some embodiments, host application 108 may access one or more data objects in record store 116 as part of an external data change at external system 104. Record store 116 may be a database or other type of data store.

In some embodiments, host application 108 may use middleware software to detect and process a change to a data object stored in external system 104. In some embodiments, middleware software is a software layer that provides a link between separate software applications. For example, middleware software may allow data contained in one database to be accessed through another.

In some embodiments, middleware software may allow host application 108 to detect changes to a data in external system 104. But this often requires copying the data of external system 104 in to host application 108. This is expensive in terms of storage, network bandwidth, and computational resources. In addition, this may decrease data security and privacy because the data is stored and managed in two separate systems by potentially two different entities.

However, in some embodiments, host application 108 may detect and process a change to a data object stored in external system 104 without copying the data of external system 104 in to host application 108. In addition, host application 108 may detect and process a change to a data object stored in external system 104 without having to transform the data object into a different data format for host application 108. For example, in some embodiments, host application 108 may detect and process a change to a data object stored in external system 104 using a tracking token generated by external system 104. In some embodiments, host application 108 may optionally write back a result of processing the change to the data object to external system 104 using the tracking token. This may reduce storage, network bandwidth, and computational resource requirements. This may further increase data security and privacy because the data of external system 104 is not copied in to host application 108.

In some embodiments that avoid copying data of external system 104 in to host application 108, host application 108 may first register with a data service at external system 104 that provides a way query and manipulate one or more data objects available in record store 114, e.g., perform CRUD operations (create, read, update, and delete) on the one or more data objects. In some embodiments, the data service may be based on the Open Data (OData) protocol. However, as would be appreciated by a person of ordinary skill in the art, the data service may be based on various other types of data access protocols. In response, host application 108 may receive a tracking token from external system 104.

In some embodiments, the tracking token may represent a transaction state of one or more data objects in external system 104. In some embodiments, the tracking token may represent a transaction state of one or more data objects for a particular user. Host application 108 may use the tracking token to detect and process a change to a data object stored in external system 104. Host application 108 may further use the tracking token to write back a result of processing the change to the data object to external system 104.

In some embodiments, host application 108 may register with the data service by transmitting a registration request to the data service. In some embodiments, host application 108 may transmit the registration request to the data service at a particular uniform resource locator (URL) such as "http://host/service." In some embodiments, the registration request may include data selection criteria. The data selection criteria may specify one or more data objects that host application 108 is interested in tracking.

In some embodiments, the data selection criteria may explicitly list one or more data objects that host application 108 is interested in tracking. For example, in some embodiments using the OData protocol, the data selection criteria may explicitly list a data object identifier for a data object in record store 114, or a collection name of a collection of data objects in record store 114.

In some embodiments, the data selection criteria may include a filter that selects one or more data objects that host application 108 is interested in tracking. For example, in some embodiments using the OData protocol, the data selection criteria may include a filter query. In some embodiments, external system 104 may select one or more data objects in record store 114 that satisfy the filter query (e.g., satisfy one or more predicate expressions in the filter query). For example, in some embodiments, the filter query may be based on one or more business rules or parameters. As would be appreciated by a person of ordinary skill in the art, the data selection criteria may include a list of one or more data objects and/or a filter.

In some embodiments, host application 108 may need to log in to external system 104 in order to register with the data service of external system 104. In addition, in some embodiments, host application 108 may want to detect and process a change to a data object stored in external system 104 for logged in user. Therefore, in some embodiments, host application 108 may transmit a registration request that includes login credentials for the user to the data service.

In some embodiments, host application 108 may access login credentials for a user from credentials database 110. External system 104 may then authenticate host application 108 based on the login credentials.

In some embodiments, credential database 110 may be a database or various other type of data store on system 102. Credential database 110 may store credentials such as usernames, passwords, encryption keys, certificates, and other data as would be appreciated by a person of ordinary skill in the art In some embodiments, external system 104 may generate a tracking token in response to host application 108 registering with a data service on external system 104. In some embodiments, the tracking token may be a unique identifier. For example, in some embodiments, the tracking token may be a unique URL.

In some embodiments, a tracking token represents a transaction state of one or more data objects in record store 114 for a particular user. In some embodiments, the transaction state of the one or more data objects represents the data states of the one or more data objects for the particular user at a particular transaction time. e.g., a query of the one or more data objects by host application 108. As would be appreciated by a person of ordinary skill in the art, external system 104 may use various data structures and methods to map the transaction state of the one or more data objects to the tracking token.

In some embodiments, external system 104 selects the one or data objects associated with the tracking token based on the data selection criteria in the registration request. In addition, in some embodiments, external system 104 selects the one or more data objects associated with the tracking token based on the user that logged into external system 104 during the registration process. As would be appreciated by a person of ordinary skill in the art, external system 104 may select the one or more data objects associated with the tracking token based on the data selection criteria and/or the user that logged into external system 104 during the registration process.

In some embodiments, after registration, host application receives the tracking token from external system 104. In some embodiments, host application 108 may use the tracking token to detect and process changes to the one or more data objects selected in the registration process. Host application 108 may further use the tracking token to write back a result of processing the changes to the one or more data objects to external system 104.

In some embodiments, host application 108 may detect and process changes to the one or more data objects selected in the registration process by polling the data service at external system 104 using the tracking token. In some other embodiments, host application 108 may detect and process changes to the one or more data objects selected in the registration process by establishing a callback address at system 102 based on the tracking token. In other words, host application 108 may subscribe to changes to the one or more data objects selected in the registration process. In some embodiments, host application 108 may indicate in the registration request whether it will poll or subscribe.

In some embodiments based on polling the data service at external system 104, host application 108 may detect and process changes to the one or more data objects selected in the registration process by transmitting a data change request to external system 104. In some embodiments, the data change request may trigger external system 104 to return changes to the one or more data objects selected in the registration process since a last transaction by the user of host application 108.

In some embodiments, the data change request may include the tracking token. In some other embodiments, where the tracking token is a unique URL, host application 108 may transmit the data change request to the tracking token.

In some embodiments, host application 108 may transmit the data change request to external system 104 based on periodic schedule. For example, host application 108 may poll external system 104 ever 10 minutes. As would be appreciated by a person of ordinary skill in the art, host application 108 may poll external system 104 at various other time intervals.

In some other embodiments, host application 108 may detect and process changes to the one or more data objects selected in the registration process by establishing a callback address at system 102 based on the tracking token. For example, in some embodiments, host application 108 may indicate in the registration request that it will subscribe to changes to the one or more data objects selected in the registration process. In addition, in some embodiments, host application 108 may create a callback service based on the tracking token.

In some embodiments, host application 108 may create the callback service by creating a data service on system 102. In some embodiments, the data service may be represented as a unique URL generated based on the tracking token.

In some embodiments, host application 108 may encrypt data transmitted between external system 104 and host application 108 via the callback service. For example, in some embodiments, host application 108 may exchange one or more encryption keys with external system 102 in order to encrypt data transmitted via the callback service.

In some embodiments, the callback service associated with host application 108 may receive changes to the one or more data objects selected in the registration process as they occur on external system 104. This may avoid unnecessary polling of external system 104.

In some embodiments, for both polling and subscribing, host application 108 may receive changes to the one or more data objects selected in the registration process in a JavaScript Object Notation (JSON) data format. In some other embodiments, host application 108 may receive the changes to the one or more data objects in a Extensible Markup Language (XML) data format. As would be appreciated by a person of ordinary skill in the art, host application 108 may receive the changes in various other data formats.

In some embodiments, host application 108 may receive changes to the one or more data objects selected in the registration process as a series of transactions. For example, in some embodiments, host application 108 may receive each add, update, and delete to a data object selected in the registration process since host application 108 last completed a transaction with external system 104 (e.g., since host application 108 polled the data service of external system 104 or received changes to the one or more data objects via the callback service).

In some embodiments, based on polling the data service at external system 104, external system 104 may determine which changes occurred to the one or more data objects selected in the registration process since host application 108 last completed a transaction with external system 104 using the tracking token associated with the data change request. In some other embodiments, based on system 102 subscribing to external system 104, external system 104 may determine which changes occurred to the one or more data objects selected in the registration process since external system 104 last transmitted changes to system 102 using the tracking token associated with the callback service.

In some embodiments, host application 108 may determine the order that the changes to the one or more data objects selected in the registration process were performed on external system 104. In some embodiments, host application 108 may determine the order that the received changes to the one or more data objects were performed on external system 104 based on transaction identifiers associated with the changes to the data objects. In some other embodiments, host application 108 may determine the order that the changes to the one or more data objects were performed on external system 104 based their relative order of receipt.

In some embodiments, host application 108 may determine the types of changes made to the one or more data objects (e.g., add, update, or delete) based on one or more change types associated with the one or more data objects. In some embodiments, host application 108 may determine the data types of the one or more data objects based on one or more data types associated with the one or more data objects. In some embodiments, host application 108 may determine the size of the one or more data objects based on one or more data sizes associated with the one or more data objects. As would be appreciated by a person of ordinary skill in the art, host application 108 may determine various other information about the changes made to the one or more data objects based on metadata associated with the one or more data objects.

In some embodiments, host application 108 may convert the changes made to the one or more data objects from a first data format to a second data format using software extension 112. This may enable a user of host application 108 to view and modify a change to a data object more easily. For example, host application 108 may convert a change to a Purchase Requisition data object stored in a JSON format to a Purchase Requisition data object stored in a ERP vendor data format using software extension 112. As would be appreciated by a person of ordinary skill in the art, host application 108 may convert changes to different types of data objects using different software extensions 112.

In some embodiments, external system 104 may automatically invalidate a tracking token after a period of inactivity with host application 108. This timeout may prevent host application 108 from further tracking changes to the one or more data objects selected in the registration process. This timeout may further reduce the storage and computational resources needed to maintain the tracking of changes to the one or more data objects selected in the registration process. Finally, this timeout may reduce the possible unauthorized access of the one or more data objects selected in the registration process.

In some embodiments, for both polling and subscribing, host application 108 may process the changes to the one or more data objects. As would be appreciated by a person of ordinary skill in the art, this processing may specific to host application 108. In response to the processing, in some embodiments, host application 108 may perform one or more functions and/or generate one or more results.

In some embodiments, host application 108 may write back the one or more results directly to external system 104. For example, in some embodiments, host application 108 may transmit a data update request that includes the one or more results to the external system 104. In some embodiments, the data update request may trigger external system 104 to write back the one or more results to external system 104, e.g., write the one or more results to the one or more data objects selected in the registration process.

In some embodiments, host application 108 may transmit the data update request to external system 104 using the OData protocol. For example, host application 108 may transmit the data update request to external system 104 using POST, PUT, or PATCH operations of the OData protocol. As would be appreciated by a person of ordinary skill in the art, host application 108 may transmit the data update request to external system 104 using various other data access protocols.

In some embodiments, the data update request may include the tracking token. In some other embodiments, where the tracking token is a unique URL, host application 108 may transmit the data update request to the tracking token. In some other embodiments, based on system 102 subscribing to external system 104, host application 108 may transmit the data update request through the callback service.

In some embodiments, host application 108 may transmit the one or more results using a JSON data format. In some other embodiments, host application 108 may transmit the one or more results in an Extensible Markup Language (XML) data format. As would be appreciated by a person of ordinary skill in the art, host application 108 may transmit the one or more results in various other data formats.

In some embodiments, host application 108 may indicate the order that external system 104 applies the one or more results. In some embodiments, host application 108 may indicate the order that external system 104 applies the one or more results using transaction identifiers associated with the one or more results. In some other embodiments, host application 108 may indicate the order that external system 104 applies the one or more results based the relative order of transmission of the one or more results to external system 104.

In some embodiments, host application 108 may indicate the types of changes of the one or more results based on one or more change types associated with the one or more results. In some embodiments, host application 108 may indicate the data types of the one or more results based on one or more data types associated with the one or more results. In some embodiments, host application 108 may indicate the size of the one or more results based on one or more data sizes associated with the one or more results. As would be appreciated by a person of ordinary skill in the art, host application 108 may indicate various other information about the one or more results using metadata associated with the one or more results.

In some embodiments, host application 108 may convert the one or more results from a first data format to a second data format using software extension 112 prior to transmission to external system 104. This may enable external system 104 to access and manipulate the one or more results more easily. As would be appreciated by a person of ordinary skill in the art, host application 108 may convert the one or more results to different types of data objects using different software extensions 112.

By way of illustration, according to an example embodiment of FIG. 1, host application 108 may be a CRM application that is interested in detecting changes and events in external system 104. External system 104 may be an ERP system.

For example, host application 108 may register with external system 104 by transmitting a registration request including data selection criteria and login credentials to a data service at external system 104. For example, host application 108 may specify via the data selection criteria that it is interested in detecting changes and events related to purchase requisition data objects in external system 104. In response, external system 104 may generate a tracking token that represents a transaction state of purchase requisition data objects in external system 104 for the logged in user. Host application 108 may then receive the tracking token from external system 104.

After host application 108 receives the tracking token, a new shipment may arrive at a warehouse and be recorded in external system 104. This new shipment may fulfill an order of a customer. In response, external system 104 may create a new purchase requisition data object in record store 114. This new purchase requisition data object may need to be approved by a manager. In this example embodiment, the manager may approve of the purchase requisition data object directly in host application 108 thereby eliminating the manager from having to log into external system 104 to perform the approval.

In this example embodiment, host application 108 may detect the creation of the purchase requisition object by transmitting a data change request containing the tracking token to external system 104. In response, host application 108 may receive the newly created purchase requisition data object from external system 104. For example, host application 108 may receive the newly created purchase requisition data object in a JSON data format. Host application 108 may further receive metadata associated with the newly created purchase requisition data object, e.g., a transaction identifier, a type of change such as a creation change, a data size, etc. Because host application 108 may receive just the relevant changes to the one or more data objects, the full data of external system 104 does not need to copied into host application 108.

In this example embodiment, host application 108 may process the received change. For example, host application 108 may trigger a communication with the customer associated with the newly created purchase requisition data object. In addition, host application 108 may solicit and receive approval of the newly created purchase requisition data object from the manager. In response, host application 108 may transmit the approval to external system 104 in a data update request. External system 104 may then write the approval directly back in to record store 114.

While FIG. 1 illustrates system 102 connected to external system 104 via network 106, a person of ordinary skill in the art would understand that system 100 may also be implemented entirely on system 102. For example, in some embodiments, host application 108, credential database 110, software extension 112, and record store 114 may be implemented together on system 102. As would be appreciated by a person of ordinary skill in the art, host application 108, credential database 110, software extension 112, and record store 114 may communicate directly with each other on system 102. For example, host application 108, credential database 110, software extension 112, and record store 114 may communicate with each other via an inter-process communication (IPC) mechanism of an operating system of system 102.

Figure 2:
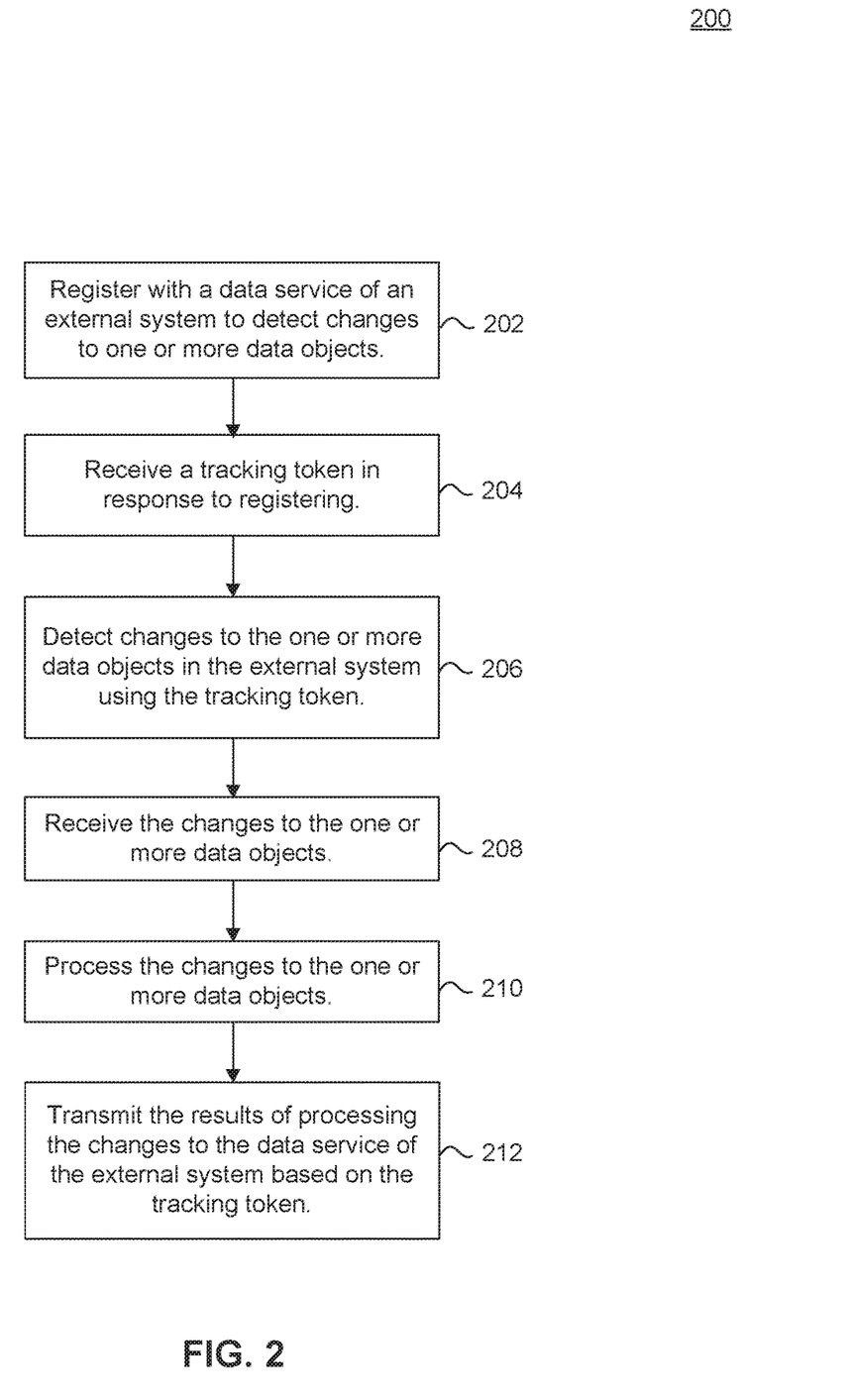
FIG. 2 is a flowchart illustrating a process for performing external change detection, according to some embodiments.

FIG. 2 is a flowchart for a method 200 for performing external change detection, according to an embodiment. Method 200 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 2, as will be understood by a person of ordinary skill in the art.

Method 200 shall be described with reference to FIG. 1. However, method 200 is not limited to that example embodiment.

In 202, host application 108 registers with a data service of external system 104 to detect changes at external system 104. In some embodiments, host application 108 transmits a registration request to the data service of external system 104. In some embodiments, host application 108 transmits data selection criteria and/or login credentials in the registration request to the data service of external system 104. In some embodiments, the data service may use the OData protocol. However, as would be appreciated by a person of ordinary skill in the art, the data service may use various other data access protocols.

In 204, host application 108 receives a tracking token in response to registering with the data service of external system 104. In some embodiments, external system may generate the tracking token in response to host application 108 registering with the data service on external system 104. In some embodiments, the tracking token may be a unique identifier. For example, in some embodiments, the tracking token may be a unique URL.

In some embodiments, the tracking token represents a transaction state of one or more data objects in record store 114. In some embodiments, the transaction state of the one or more data objects represents the data states of the one or more data objects at a particular transaction time.

In some embodiments, external system 104 may select the one or data objects associated with the tracking token based on the data selection criteria in the registration request. In addition, in some embodiments, external system 104 may select the one or more data objects associated with the tracking token based on the user that logged into external system 104 during the registration process.

In 206, host application 108 detects changes to the one or more data objects in external system 104 using the tracking token. In some embodiments, host application 108 may detect and process changes to the one or more data objects selected in the registration process by polling the data service at external system 104 using the tracking token. In some other embodiments, host application 108 may detect and process changes to the one or more data objects selected in the registration process by establishing a callback address at system 102 based on the tracking token.

In 208, host application 108 receives the changes to the one or more data objects selected in the registration process. For example, in some embodiments, host application 108 may receive the changes in a JSON data format. In some other embodiments, host application 108 may receive the changes in a XML data format. As would be appreciated by a person of ordinary skill in the art, host application 108 may receive the changes in various other data formats.

In some embodiments, host application 108 may receive the changes to the one or more data objects selected in the registration process as a series of transactions. For example, in some embodiments, host application 108 may receive each add, update, and delete to a data object selected in the registration process since host application 108 last completed a transaction with external system 104.

In 210, host application 108 processes the changes to the one or more data objects selected in the registration process. In some embodiments, host application 108 may process the changes in the order they were performed on external system 104. This may require host application 108 to determine the order of the changes to the one or more data objects.

In some embodiments, host application 108 may determine the order of the changes to the one or more data objects based on transaction identifiers associated with the changes to the data objects. In some other embodiments, host application 108 may determine the order of the changes to the one or more data objects based their relative order of receipt.

In some embodiments, host application 108 may process the changes to the one or more data objects selected in the registration process based on the types of the changes, the data types associated with the changes, and/or the sizes of the changes. In some embodiments, host application 108 may determine this information about the changes made to the one or more data objects based on metadata associated with the changes.

In some embodiments, host application 108 may convert the changes made to the one or more data objects from a first data format to a second data format using software extension 112. This may enable a user of host application 108 to view and modify the changes to the one or more data objects more easily.

In 212, host application 108 may optionally transmit one or more results of the processing of the changes to the data service of external system 104 based on the tracking token. In some embodiments, host application 108 may transmit a data update request that includes the one or more results to external system 104. In some embodiments, the data update request may include the tracking token. In some other embodiments, where the tracking token is a URL, host application 108 may transmit the data update request to the tracking token URL. In some other embodiments, based on system 102 subscribing to external system 104, host application 108 may transmit the data update request through a callback service. In some embodiments, the data update request may trigger external system 104 to write back the one or more results to external system 104.

In some embodiments, host application 108 may indicate the order that external system 104 should apply the one or more results. In some embodiments, host application 108 may indicate the order using transaction identifiers associated with the one or more results. In some other embodiments, host application 108 may indicate the order based the order of transmission of the one or more results to external system 104.

In some embodiments, host application 108 may indicate the types of changes of the one or more results based on one or more change types associated with the one or more results. In some embodiments, host application 108 may indicate the data types of the one or more results based on one or more data types associated with the one or more results. In some embodiments, host application 108 may indicate the size of the one or more results based on one or more data sizes associated with the one or more results. As would be appreciated by a person of ordinary skill in the art, host application 108 may indicate various other information about the one or more results using metadata associated with the one or more results.

Figure 3:
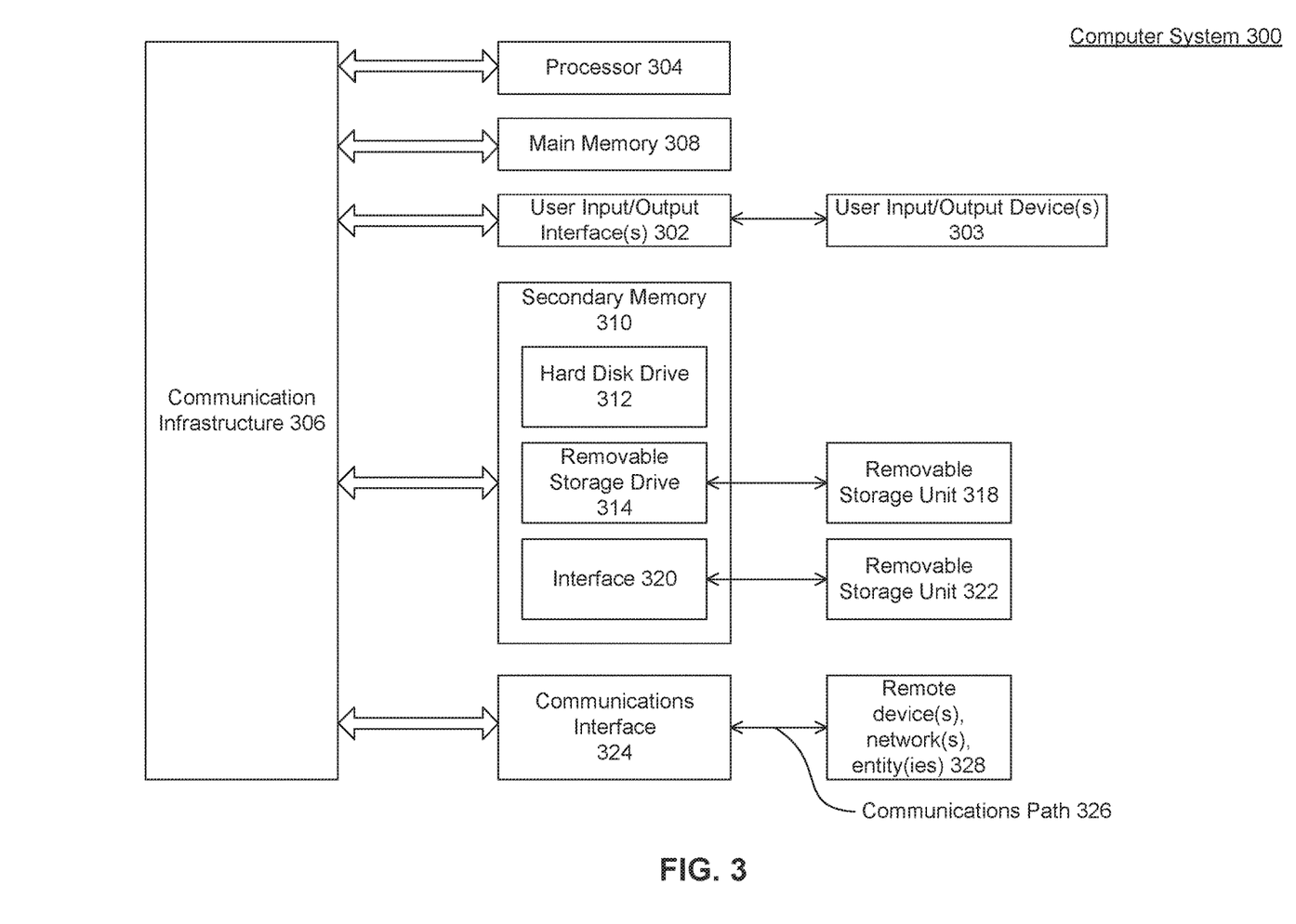
FIG. 3 is an example computer system useful for implementing various embodiments.

Various embodiments can be implemented, for example, using one or more computer systems, such as computer system 300 shown in FIG. 3. Computer system 300 can be used, for example, to implement method 200 of FIG. 2. For example, computer system 300 can perform transmitting a registration request to a data service at an external system, wherein the registration request comprises data selection criteria. Computer system 300 can further perform detecting a change to the data object in the external system using a tracking token. Computer system 300 can be any computer capable of performing the functions described herein.

Computer system 300 can be any well-known computer capable of performing the functions described herein.

Computer system 300 includes one or more processors (also called central processing units, or CPUs), such as a processor 304. Processor 304 is connected to a communication infrastructure or bus 306.

One or more processors 304 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 300 also includes user input/output device(s) 303, such as monitors, keyboards, pointing devices, etc., that communicate with communication infrastructure 306 through user input/output interface(s) 302.

Computer system 300 also includes a main or primary memory 308, such as random access memory (RAM). Main memory 308 may include one or more levels of cache. Main memory 308 has stored therein control logic (i.e., computer software) and/or data.

Computer system 300 may also include one or more secondary storage devices or memory 310. Secondary memory 310 may include, for example, a hard disk drive 312 and/or a removable storage device or drive 314. Removable storage drive 314 may be a floppy disk drive, a magnetic tape drive, a compact disk drive, an optical storage device, tape backup device, and/or any other storage device/drive.

Removable storage drive 314 may interact with a removable storage unit 318. Removable storage unit 318 includes a computer usable or readable storage device having stored thereon computer software (control logic) and/or data. Removable storage unit 318 may be a floppy disk, magnetic tape, compact disk, DVD, optical storage disk, and/any other computer data storage device. Removable storage drive 314 reads from and/or writes to removable storage unit 318 in a well-known manner.

According to an exemplary embodiment, secondary memory 310 may include other means, instrumentalities or other approaches for allowing computer programs and/or other instructions and/or data to be accessed by computer system 300. Such means, instrumentalities or other approaches may include, for example, a removable storage unit 322 and an interface 320. Examples of the removable storage unit 322 and the interface 320 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 300 may further include a communication or network interface 324. Communication interface 324 enables computer system 300 to communicate and interact with any combination of remote devices, remote networks, remote entities, etc. (individually and collectively referenced by reference number 328). For example, communication interface 324 may allow computer system 300 to communicate with remote devices 328 over communications path 326, which may be wired and/or wireless, and which may include any combination of LANs, WANs, the Internet, etc. Control logic and/or data may be transmitted to and from computer system 300 via communication path 326.

In an embodiment, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 300, main memory 308, secondary memory 310, and removable storage units 318 and 322, as well as tangible articles of manufacture embodying any combination of the foregoing. Such control logic, when executed by one or more data processing devices (such as computer system 300), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 3. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method, comprising:
    transmitting, by at least one processor, a registration request to a data service at an external system, wherein the registration request comprises data selection criteria and a login credential for the external system, and the external system generates a tracking token in response to a data object in the external system satisfying the data selection criteria for a user corresponding to the login credential, wherein the tracking token represents a transaction state of the data object at the external system for the user corresponding to the login credential;
    receiving, by the at least one processor, the tracking token in response to the transmitting the registration request;
    detecting, by the at least one processor, a change to the data object in the external system for the user using the tracking token by creating a callback service based on the tracking token;
    exchanging one or more encryption keys with the external system to encrypt data transmitted between the external system and the at least one processor via the callback service;
    receiving, by the at least one processor, the change to the data object for the user from the external system via the callback service and a transaction order indicating an order in which the change to the data object occurred with respect to other changes;
    processing, by the at least one processor, the change to the data object for the user according to the transaction order; and
    transmitting, by the at least one processor, an update to the external system based on the tracking token and in response to the processing via the callback service, wherein the tracking token is invalidated by the external system after a predetermined period of inactivity.

2. The method of claim 1, where the detecting further comprises:
    transmitting a data change request to the external system based on the tracking token and a periodic schedule.

3. The method of claim 2, wherein the data change request triggers the external system to return additional changes to the data object since a last transaction by the user and prior to the predetermined period of inactivity.

4. The method of claim 1, wherein the receiving the change to the data object further comprises:
    receiving the change to the data object in a JavaScript Object Notation (JSON) data format or an Extensible Markup Language (XML) data format; and
    converting the JSON data format or the XML data format of the change to the data object to a different data format using a software extension.

5. The method of claim 1, wherein the receiving the change to the data object further comprises:
    receiving metadata associated with the change to the data object, wherein the metadata indicates a change type of the change to the data object or the transaction order associated with the change to the data object.

6. The method of claim 1, further comprising:
    transmitting an update to the external system based on the processing and the tracking token.

7. The method of claim 1, wherein the transmitting the update to the external system further comprises:
    transmitting the update to the tracking token at the external system, wherein the update comprises the change to the data object.

8. The method of claim 1, wherein the transmitting the update to the external system further comprises:
    transmitting the update to the callback service at the external system, wherein the update comprises the change to the data object.

9. A system, comprising:
    a memory; and
    at least one processor coupled to the memory and configured to:
    transmit a registration request to a data service at an external system, wherein the registration request comprises data selection criteria and a login credential for the external system, and the external system generates a tracking token in response to a data object in the external system satisfying the data selection criteria for a user corresponding to the login credential, wherein the tracking token represents a transaction state of the data object at the external system;
    receive the tracking token in response to the transmitting the registration request;
    detect a change to the data object in the external system using the tracking token for the user by creating a callback service based on the tracking token;
    exchange one or more encryption keys with the external system to encrypt data transmitted between the external system and the at least one processor via the callback service;
    receive the change to the data object for the user from the external system via the callback service and a transaction order indicating an order in which the change to the data object occurred with respect to other changes;
    process the change to the data object for the user according to the transaction order; and
    transmit an update to the external system based on the tracking token and in response to the processing via the callback service, wherein the tracking token is invalidated by the external system after a predetermined period of inactivity.

10. The system of claim 9, wherein to detect the at least one processor is further configured to:
    transmit a data change request to the external system based on the tracking token and a periodic schedule.

11. The system of claim 10, wherein the data change request triggers the external system to return additional changes to the data object since a last transaction by the user and prior to the predetermined period of inactivity.

12. The system of claim 9, wherein to receive the change to the data object, the at least one processor is further configured to:

receive the change to the data object in a JavaScript Object Notation (JSON) data format or an Extensible Markup Language (XML) data format.

13. The system of claim 9, wherein to receive the change to the data object, the at least one processor is further configured to:
receive metadata associated with the change to the data object, wherein the metadata indicates a change type of the change to the data object or the transaction order associated with the change to the data object.

14. The system of claim 9, the at least one processor further configured to:
transmit an update to the external system based on the processing and the tracking token.

15. A non-transitory computer-readable medium having instructions stored thereon that, when executed by at least one computing device, cause the at least one computing device to perform operations comprising:
transmitting a registration request to a data service at an external system, wherein the registration request comprises data selection criteria and a login credential for the external system, and the external system generates a tracking token in response to a data object in the external system satisfying the data selection criteria for a user corresponding to the login credential, wherein the tracking token represents a transaction state of the data object at the external system for the user corresponding to the login credential;
receiving the tracking token in response to the transmitting the registration request;
detecting a change to the data object in the external system using the tracking token for the user by creating a callback service based on the tracking token;
exchanging one or more encryption keys with the external system to encrypt data transmitted between the external system and the at least one processor via the callback service;
receiving the change to the data object for the user from the external system via the callback service and a transaction order indicating an order in which the change to the data object occurred with respect to other changes;
processing the change to the data object for the user according to the transaction order; and
transmitting an update to the external system based on the tracking token and in response to the processing via the callback service, wherein the tracking token is invalidated by the external system after a predetermined period of inactivity.

16. The non-transitory computer-readable medium of claim 15, the detecting comprising:
transmitting a data change request to the external system based on the tracking token and a periodic schedule.

17. The non-transitory computer-readable medium of claim 16, wherein the data change request triggers the external system to return additional changes to the data object since a last transaction by the user and prior to the predetermined period of inactivity.

18. The non-transitory computer-readable medium of claim 15, the receiving the change to the data object comprising:
receiving the change to the data object in a JavaScript Object Notation (JSON) data format or an Extensible Markup Language (XML) data format; and
converting the JSON data format or the XML data format of the change to the data object to a different data format using a software extension.

19. The non-transitory computer-readable medium of claim 15, the receiving the change to the data object comprising:
receiving metadata associated with the change to the data object, wherein the metadata indicates a change type of the change to the data object or the transaction order associated with the change to the data object.

20. The non-transitory computer-readable medium of claim 15, the operations further comprising:
transmitting an update to the external system based on the processing and the tracking token.

* * * * *

UNITED STATES PATENT AND TRADEMARK OFFICE
CERTIFICATE OF CORRECTION

| | | |
|---|---|---|
| PATENT NO. | : 11,093,475 B2 | Page 1 of 1 |
| APPLICATION NO. | : 15/803408 | |
| DATED | : August 17, 2021 | |
| INVENTOR(S) | : Ralf Schundelmeier et al. | |

It is certified that error appears in the above-identified patent and that said Letters Patent is hereby corrected as shown below:

In the Claims

Claim 10, Column 14, Line 57, "wherein to detect the at least" should read --wherein to detect the change, the at least--.

Signed and Sealed this
Twenty-fifth Day of January, 2022

Drew Hirshfeld
*Performing the Functions and Duties of the*
*Under Secretary of Commerce for Intellectual Property and*
*Director of the United States Patent and Trademark Office*